US010713447B2

(12) United States Patent
Xie et al.

(10) Patent No.: US 10,713,447 B2
(45) Date of Patent: Jul. 14, 2020

(54) BACKLIGHT POSITION CORRECTION DEVICE

(71) Applicant: BOE TECHNOLOGY GROUP CO., LTD., Beijing (CN)

(72) Inventors: Jiabin Xie, Beijing (CN); Zailin Hong, Beijing (CN); Xiaoguang Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 193 days.

(21) Appl. No.: 15/933,456

(22) Filed: Mar. 23, 2018

(65) Prior Publication Data
US 2019/0102579 A1    Apr. 4, 2019

(30) Foreign Application Priority Data

Aug. 29, 2017   (CN) ..................... 2017 2 1275240 U

(51) Int. Cl.
| | | |
|---|---|---|
| *G02F 1/13* | (2006.01) | |
| *G06K 1/12* | (2006.01) | |
| *G06K 15/16* | (2006.01) | |
| *B41J 29/19* | (2006.01) | |
| *B41J 29/393* | (2006.01) | |
| *G06K 15/02* | (2006.01) | |

(52) U.S. Cl.
CPC .............. *G06K 1/121* (2013.01); *B41J 29/19* (2013.01); *B41J 29/393* (2013.01); *G02F 1/1303* (2013.01); *G06K 15/16* (2013.01); *G06K 15/18* (2013.01)

(58) Field of Classification Search
CPC .......... G06K 1/121; B41J 29/38; B41J 29/393
See application file for complete search history.

(56) References Cited

U.S. PATENT DOCUMENTS

| | | | | |
|---|---|---|---|---|
| 3,761,177 A | * | 9/1973 | Corse ...................... | B41F 33/02 356/23 |
| 5,870,204 A | * | 2/1999 | Chiu .................. | G01N 21/8903 356/430 |
| 7,675,625 B2 | * | 3/2010 | Yoon .................. | G01N 21/8803 356/239.1 |

(Continued)

FOREIGN PATENT DOCUMENTS

| | | |
|---|---|---|
| CN | 103568593 A | 2/2014 |
| CN | 104960341 A | 10/2015 |

*Primary Examiner* — Thien M Le
*Assistant Examiner* — April A Taylor
(74) *Attorney, Agent, or Firm* — Calfee, Halter & Griswold LLP

(57) ABSTRACT

The present disclosure relates to the technical field of backlight code printing, and provides a backlight position correction device, which includes an assembly line and an alignment mechanism. The assembly line is configured to drive linear motion of the backlight; and the alignment mechanism is used to adjust a plurality of back-up backlights such that the backlights are in the same straight line. The alignment mechanism includes a fixing plate and a motion component. The fixing plate is disposed at a side of the assembly line. The motion component is disposed at a side of the assembly line opposite to the fixing plate, and configured to push a side of the backlight such that the backlight abuts against the fixing plate.

12 Claims, 3 Drawing Sheets

(56) References Cited

U.S. PATENT DOCUMENTS

| | | | | |
|---|---|---|---|---|
| 7,999,905 | B2* | 8/2011 | Kim | G02F 1/1303 |
| | | | | 29/564.7 |
| 8,405,831 | B2* | 3/2013 | Carlson | B65H 23/0204 |
| | | | | 356/239.1 |
| 9,096,048 | B2* | 8/2015 | Kim | B32B 38/18 |
| 9,513,412 | B2* | 12/2016 | Carlson | G01D 5/34707 |
| 10,562,721 | B2* | 2/2020 | Xie | H05K 13/0434 |
| 2018/0326763 | A1* | 11/2018 | Wooldridge | B41J 13/12 |

* cited by examiner

BACKLIGHT POSITION CORRECTION DEVICE

CROSS REFERENCE

The present application claims the priority of Chinese Patent Application No. 201721275240.8, and filed on Sep. 29, 2017, and the entire contents thereof are incorporated herein by reference to serve as a part of the present application.

TECHNICAL FIELD

The present disclosure relates to the technical field of backlight code printing, and in particular, to a backlight position correction device.

BACKGROUND

The backlight enters into a code printing process after completion of being produced from a film-forming machine, the code printing process marks production information for the backlight products. The backlight is in a front-up state after the completion of being produced from the film-forming machine, but the production information needs to be jetted on a back surface of the backlight. Therefore, the backlight needs to be turned over to the back-up state before the code printing process is performed. In addition, positions of the backlight needs to be corrected before the code printing process is performed, so that positions of the production information printed on the backlight by the coding printing machine are the same.

At present, in the production process of the backlight, it is necessary to turn over the backlight on the assembly line from the front-up state to the back-up state, so that the code printing machine performs the code printing marks on the back surface of the backlight from top to bottom.

It should be noted that, information disclosed in the above background portion is provided only for better understanding of the background of the present disclosure, and thus it may contain information that does not form the prior art known by those ordinary skilled in the art.

SUMMARY

According to an aspect of the present disclosure, there is provided a backlight position correction device, including:
an assembly line; and
an alignment mechanism, configured to adjust a position of the backlight on the assembly line,
the alignment mechanism includes:
a fixing plate, disposed at a side of the assembly line; and
a motion component, disposed at a side of the assembly line opposite to the fixing plate, and configured to push a side of the backlight such that the backlight abuts against the fixing plate.

In an exemplary embodiment of the present disclosure, a contact area of the motion component and a side surface of the backlight is smaller than an area of the side surface of the backlight.

In an exemplary embodiment of the present disclosure, the position correction device further includes:
a turnover mechanism, disposed at a side of the assembly line, and configured to turn over the backlight from a first state to a second state.

In an exemplary embodiment of the present disclosure, the turnover mechanism includes:

a rotating driving component, disposed at a side of the assembly line;
a rotating plate component, connected to the rotating drive component; and
a suction block, disposed on the rotating plate component and configured to attach the backlight on the rotating plate component.

In an exemplary embodiment of the present disclosure, the rotating plate component includes:
a connecting plate, connected to the rotating driving component; and
a plurality of protruding rods, connected to the connecting plate, and an extending direction of the protruding rod being perpendicular to a rotating shaft of the rotating plate component.

In an exemplary embodiment of the present disclosure, the assembly line includes:
a plurality of strip-shaped carriers, a plurality of the carriers being arranged in parallel and gaps existing between the plurality of carriers.

In an exemplary embodiment of the present disclosure, the strip-shaped carrier is a rubber band.

In an exemplary embodiment of the present disclosure, the protruding rod has a position corresponding to the gap and is capable of passing through the gap.

In an exemplary embodiment of the present disclosure, the turnover mechanism further includes:
a moving driving component, configured to drive the rotating driving component and the rotating plate component away from or close to the assembly line.

In an exemplary embodiment of the present disclosure, the turnover mechanism further includes:
a first position sensor, configured to sense whether the backlight reaches a turnover position, wherein the turnover mechanism turns over the backlight in response to a sensing signal of the first position sensor.

In an exemplary embodiment of the present disclosure, the alignment mechanism further includes:
a second position sensor, configured to sense whether the backlight reaches an alignment position, wherein the motion component pushes the backlight in response to a sensing signal of the second position sensor.

In an exemplary embodiment of the present disclosure, the motion component includes:
a support component, provided with a moving shaft; and
a moving plate, perpendicularly connected to the moving shaft.

BRIEF DESCRIPTION OF THE DRAWINGS

The above and other features and advantages of the present disclosure will become more apparent by describing example embodiments thereof in detail with reference to the accompanying drawings.

DETAILED DESCRIPTION

Figure 1:
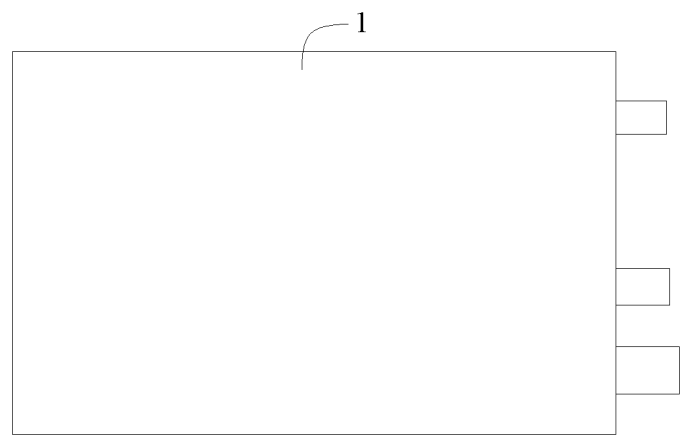
FIG. 1 is a schematic structural diagram of a backlight with no tab on its sides.

The exemplary implementations will now be described more fully with reference to the accompanying drawings. However, the exemplary implementations can be implemented in various forms and should not be understood as being limited to the embodiments set forth herein; on the contrary, these implementations are provided so that the present disclosure will be thorough and complete, and the concept of exemplary implementations will be fully conveyed to those skilled in the art. In the drawings, the thicknesses of the regions and layers are exaggerated for clarity. In the drawings, the same reference numerals denote the same or similar structure, thus their detailed description will be omitted.

Figure 2:
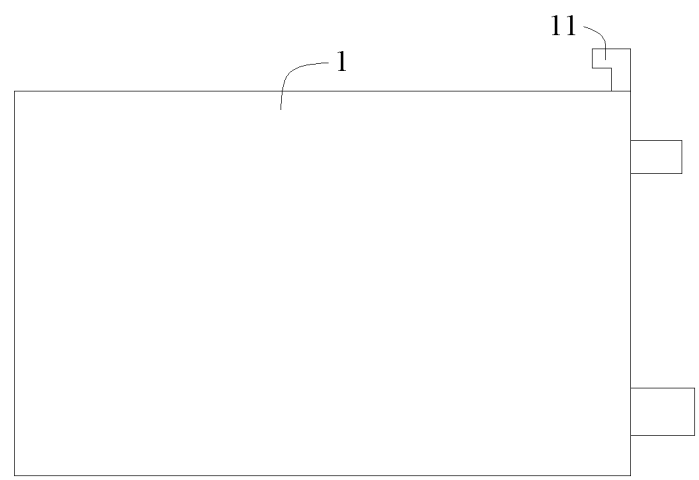
FIG. 2 is a schematic structural diagram of a backlight with a tab on its side.
Figure 3:
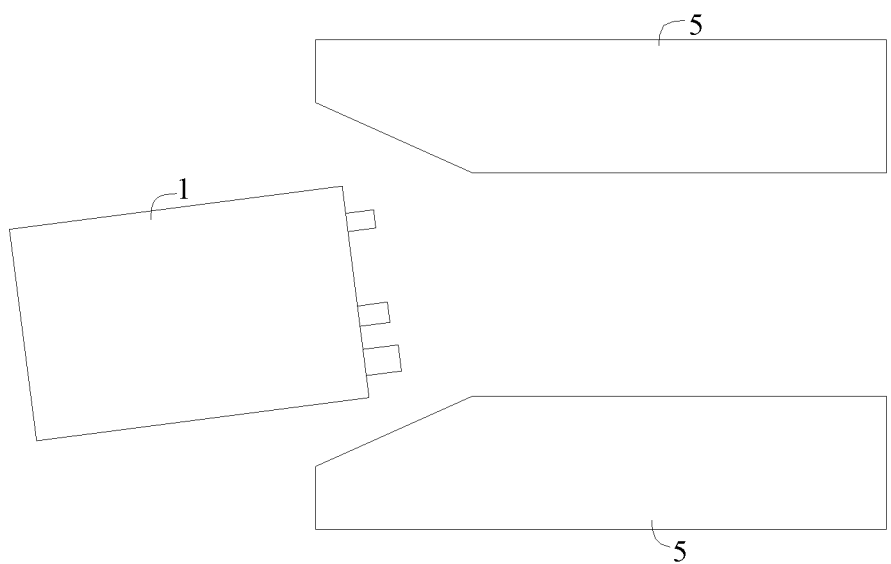
FIG. 3 is a schematic diagram of a principle of the second backlight correction method in the prior art.

At present, there are two main methods to correct a position of a backlight 1. One method is that: after the manufacturing of the backlight 1 is completed, an operator collects the backlight 1, and then manually places the backlight 1 one by one on the assembly line and performs the alignment by utilizing one side of the backlight 1. The assembly line drives the backlight 1 to travel in uniform motion, and the code printing machine 6 performs code printing on the backlight 1 in the uniform motion. This manner may be applied to any kind of backlight 1. However, it requires a specialized operator to perform the turnover and alignment, resulting in a waste of manpower; besides, it is likely to cause defects by turning over the backlight 1 manually. Referring to the principle diagram of the second backlight correction method in the prior art as shown in FIG. 3, another manner is shown, that is: two fixed rectifying plates 5 are added at two sides of the assembly line, and a bell mouth is formed at an entrance of the backlight 1. The backlight 1 is automatically corrected through the bell mouth. However, this manner has strict requirements on the appearance of the backlight 1. It requires that left and right sides of the backlight 1 must be smooth and free of other protrusions, such as the schematic structural diagram of the backlight shown in FIG. 1. It cannot deal with various kinds of backlights. Especially, it cannot be applied to the correction of the backlight 1 with tabs on its side surfaces, such as the schematic structural diagram of the backlight shown in FIG. 2.

Figure 4:
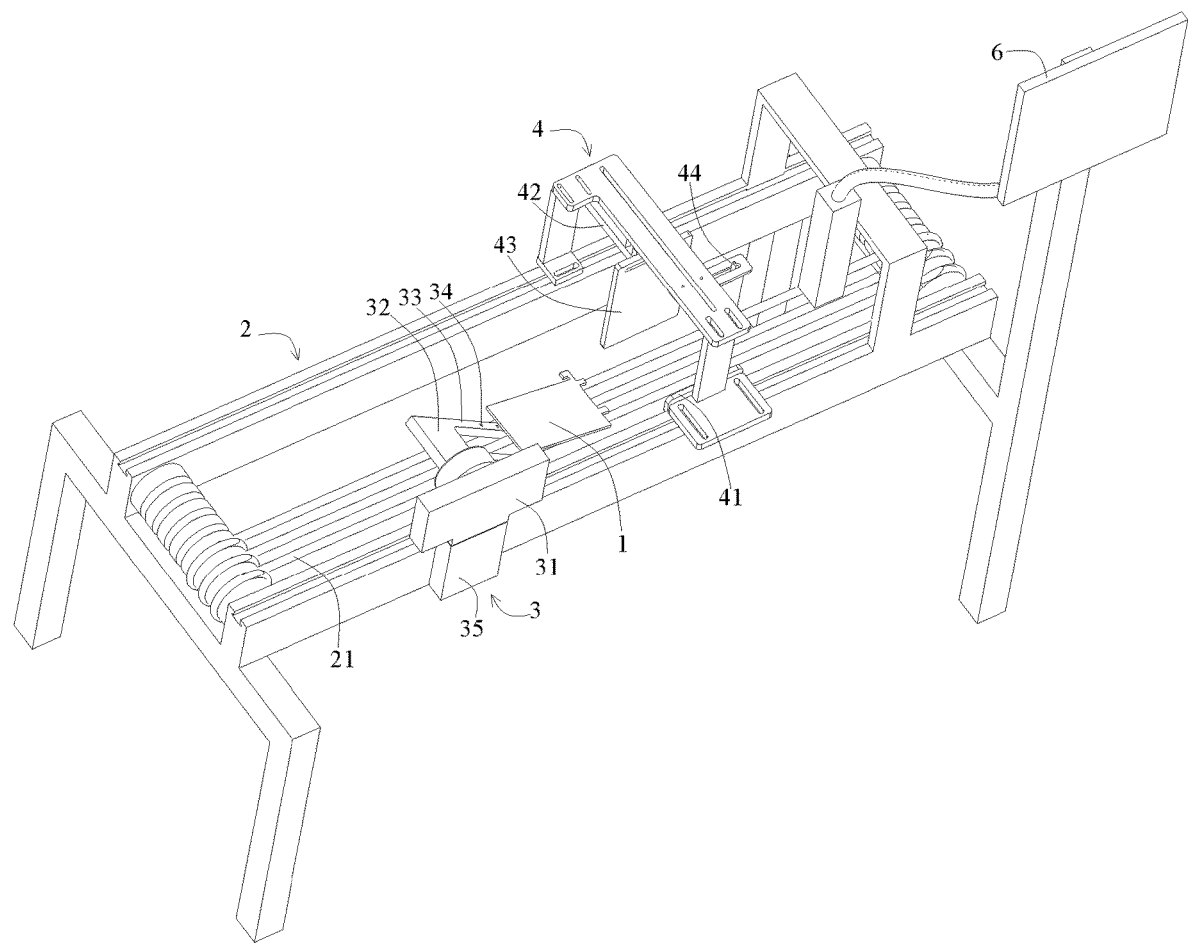
FIG. 4 is a schematic structural view of a backlight position correction device of an embodiment of the present disclosure.

Referring to FIG. 4, a schematic structural view of a backlight position correction device of an embodiment of the present disclosure is shown. The backlight position correction device may include an assembly line, a turnover mechanism 3, an alignment mechanism 4, and the like. Both the turnover mechanism 3 and the alignment mechanism are installed on the assembly line. The alignment mechanism 4 is used to adjust a position of the backlight 1 on the assembly line. The alignment mechanism 4 may include a fixing plate 41 and a motion component, or the like. The fixing plate 41 is disposed at a side of the assembly line. The motion component is disposed at a side of the assembly line opposite to the fixing plate 41, and configured to push a side of the backlight 1. In this way, the backlight 1 abuts against the fixing plate 41. The turnover mechanism 3 is used to turn over the backlight 1 from a first state to a second state.

A contact area of the motion component and a side surface of the backlight 1 is smaller than an area of the side surface of the backlight 1. A contact area of the fixing plate 41 and a side surface of the backlight 1 is smaller than an area of the side surface of the backlight. In the present exemplary embodiment, a length of the moving plate 43 may be smaller than that of the backlight 1, and a length of the fixing plate 41 may also be smaller than that of the backlight 1. Such a design may be applied to the correction of the backlight 1 with tabs on its side surfaces. Of course, when the length of the moving plate 43 is greater than that of the backlight 1, the backlight 1 with tabs 11 on its side surfaces may also be corrected, as long as a control system has calculated the timing for protruding the moving plate 43 to prevent touch between the moving plate 43 and the tab 11.

The assembly line may drive the backlight 1 to move linearly. The assembly line, also known as a production line, is an industrial production manner and refers to that each production unit only focus on the work of a certain fragment to improve the work efficiency and yield. The assembly line may include traction members, load carrying members, drive devices, tensioners, redirecting devices and supports, and the like.

Optionally, the assembly line may include a plurality of strip-shaped carriers arranged in parallel, and gaps are provided between the plurality of carriers.

Figure 5:
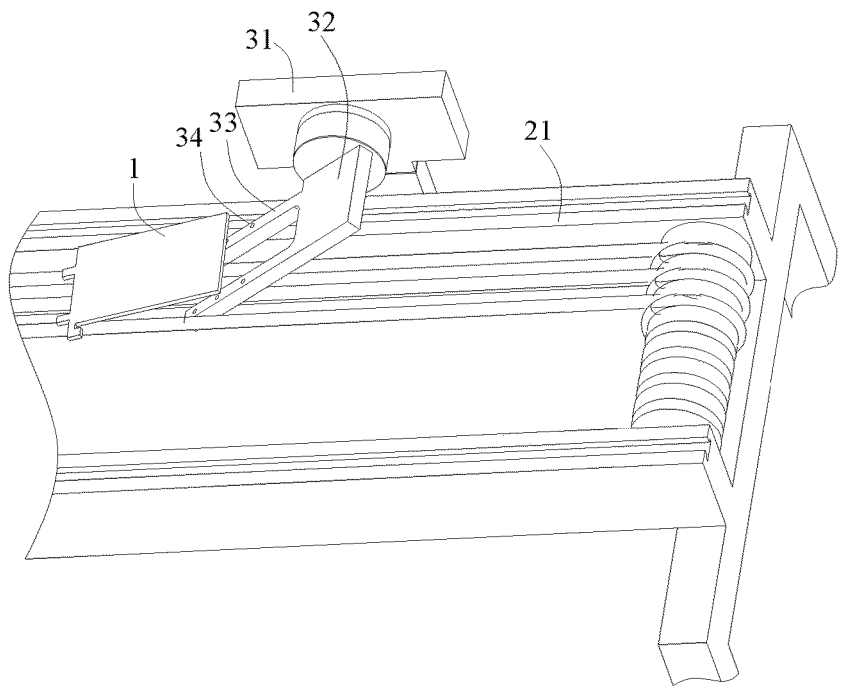
FIG. 5 is a schematic structural view of a turnover mechanism in FIG. 4.

Referring to FIG. 5, a schematic structural view of the turnover mechanism 3 is shown. Because the turnover process will cause irregular of the backlight 1, the backlight 1 needs to be turned over first and then corrected after its production is completed. The irregular caused by the turnover may be adjusted to be regular if the correction is performed after the turnover. The turnover mechanism 3 may be disposed at a side of the assembly line. The turnover mechanism 3 may be used to turn over the backlight 1 from a first state to a second state. In this example embodiment, the first state may be a face-up state and the second state may be a back-up state, this is because the backlight 1 is generally in a face-up state after its production is completed, but the code printing needs to be performed on the back surface of the backlight 1. Of course, the first state and the second state may be interchangeable depending on different circumstances.

The turnover mechanism 3 may include a rotating driving component 31, a rotating plate component and a suction block 34, etc. The rotating plate component may include a connecting plate 32 and a protruding rod 33. The rotating driving component 31 may be a rotating cylinder. The rotating cylinder has a rotating shaft. The connecting plate 32 may be fixedly connected onto the rotating shaft. The connecting plate 32 and the rotating shaft may be disposed along the same central axis. The connecting plate 32 may be formed in a rectangular shape. Two parallel protruding rods 33 may be disposed on the side surfaces of the connecting plate 32. An extending direction of the protruding rod 33 is perpendicular to a central axis of the rotating shaft. A gap between the protruding rods 33 match with rubber bands 21 on the rubber band type assembly line 2. Similarly, the protruding rod 33 matches with the gap between the rubber bands 21, such that the protruding rod 33 may be inserted into the gap between the rubber bands 21, to attach the backlight 1. The protruding rod 33 may function as a suction element. That is, the protruding rod 33 is equivalent to the suction block and attaches the backlight by vacuum suction. Of course, it is also possible to provide the suction block 34 on the protruding rod 33. The suction block 34 attaches the backlight 1 to the rotating plate component by vacuum suction, such that the backlight 1 is rotatable together with the rotating plate component. Through the turnover mechanism 3, the backlight 1 may be turned over automatically without human intervention, thereby reducing manpower waste and reducing the defect rate. In addition, the structure of the turnover mechanism 3 is not limited to the above description. For example, the rotating driving component 31 may be replaced by a motor. Alternatively, the connecting plate 32 may also be not provided, i.e., the protruding rod 33 is directly disposed on the rotating shaft of the motor or the rotating cylinder. The number of the protruding rods 33 may also be set to be three or more.

In the present exemplary embodiment, the rubber band type assembly line 2 is adopted. That is, the load carrying member of the assembly line is a plurality of rubber bands 21 arranged in parallel, and the space between two adjacent rubber bands 21 may be adjusted arbitrarily. Compared with the traditional belt type assembly line, the rubber band type assembly line 2 may prevent the dust from staying on the assembly line. Meanwhile, when the backlight 1 moves on the rubber band type assembly line 2, it is convenient for the operator to take the backlight 1 from the rubber band type assembly line 2 since there are many hollowed parts on the assembly line. It is also convenient to insert the protruding rod 33 into the gap. Of course, those skilled in the art may understand that the assembly line may not adopt the rubber band assembly line 2, it may adopt the strap type assembly line, or the belt type assembly line, as long as there is a gap between the plurality of belts.

Further, the turnover mechanism 3 may further include a first position sensor. The first position sensor may be configured to sense whether the backlight 1 reaches a turnover position, such that the turnover mechanism 3 turns over the backlight 1 in response to a sensing signal of the first position sensor. In the present example embodiment, the first position sensor may be mounted on the protruding rod 33, or may also be mounted on a bracket of the assembly line. The first position sensor may use a fiber optic sensor, or a proximity sensor or the like, which is not specially limited herein. It may accurately sense whether the backlight 1 reaches the turnover position or not by means of the first position sensor, thereby improving the intelligence of the entire device.

Further, the correction device may further include a moving driving component 35. The moving driving component 35 may be used to drive the turnover mechanism 3 to move away from or close to the assembly line. In the present exemplary embodiment, the moving driving assembly 35 may adopt a linear cylinder, and the linear cylinder may be installed vertically or obliquely. The linear cylinder has a telescopic shaft, and the rotating cylinder is mounted on the telescopic shaft. The telescopic shaft may drive the rotating cylinder to move, so as to cause the rotating cylinder and the rotating plate component and the suction block 34 to move away from or close to the assembly line. The rotating cylinder and the rotating plate assembly and the suction block 34 may interfere with the motion of the backlight 1. The turnover mechanism 3 may be brought away from the assembly line through the moving driving component 35 when the turnover does not need to be performed. A deviation may exist between the altitudinal positions or the lateral positions where the turnover mechanism 3 is installed. The altitudinal positions or the lateral positions of the turnover mechanism 3 may be adjusted through the moving driving component 35. Of course, in other example embodiments of the present disclosure, a linear motor may be employed to replace the linear cylinder.

The specific operating process of the turnover mechanism 3 is illustrated as follows.

In one scheme: at an initial position, the protruding rod 33 is not inserted into the gap between the rubber bands 21. The protruding rod 33 is located above the rubber band assembly line 2. When the first position sensor senses that the backlight 1 needs to be turned over when reaching a turnover position, the suction block 34 may be rotated downwards to a upper top surface of the backlight 1 firstly to attach the backlight 1 from the upper top surface and then rotated upwards, until the backlight 1 contacts the rubber band 21. The assembly line drives the backlight 1 to move forward by the friction force between the rubber band 21 and the backlight 1. The rotating shaft drives the protruding rod 33 to rotate downwards and then upwards to the initial position, to perform the turnover of the next backlight 1.

In another scheme: at an initial position, the protruding rod 33 may be inserted into the gap between the rubber bands 21. When the first position sensor senses that the backlight 1 needs to be turned over when reaching a turnover position, the suction block 34 attach the backlight 1 from the lower bottom surface of the backlight 1, and then rotates upwards, until the backlight 1 contacts the rubber band 21. The assembly line drives the backlight 1 to move forward by the friction force between the rubber band 21 and the backlight 1. The rotating shaft drives the protruding rod 33 to rotate upwards to the initial position, to perform the turnover of the next backlight 1.

Figure 6:
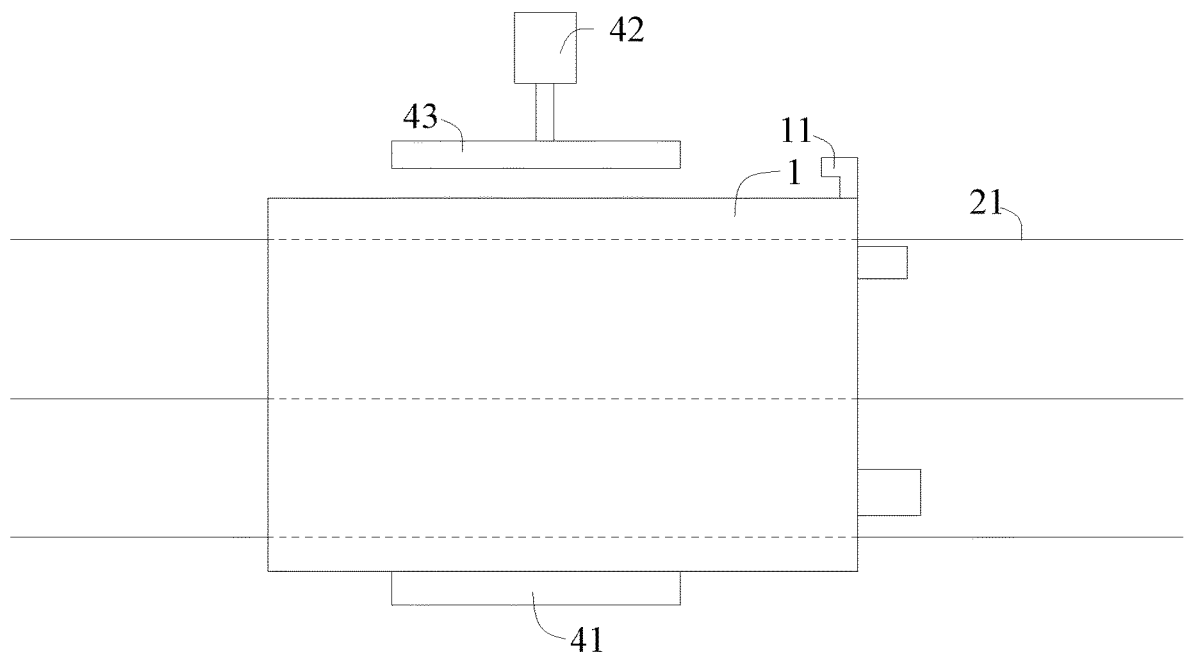
FIG. 6 is a schematic structural view of the alignment mechanism in FIG. 4.

Referring to FIG. 6, it is a structural schematic diagram of the alignment mechanism 4. The alignment mechanism 4 is disposed at a downstream side of the turnover mechanism 3. The "upstream" or "downstream" herein is determined by a position passed by the backlight 1. That is, the side where the backlight 1 passes first is the "upstream side", and the side where the backlight 1 passes later is the "downstream side". The alignment mechanism 4 may adjust the plurality of back-up backlights to be in the same straight line. In this example embodiment, the alignment mechanism 4 may include a fixing plate 41 and a motion component. The motion component may include a supporting component 42 and a moving plate 43. The fixing plate 41 is disposed at a side of the assembly line. The supporting component 42 is disposed at the other side of the assembly line, and the supporting component 42 is disposed opposite to the fixing plate 41. The support component 42 may adopt a linear cylinder. The support assembly 42 is provided with a moving shaft. A moving plate 43 is connected to the moving shaft. The moving plate 43 is perpendicular to the moving shaft. The moving plate 43 is disposed opposite to the fixing plate 41. The linear cylinder may drive the moving plate 43 to move linearly. When the backlight 1 passes, the linear cylinder drives the moving plate 43 to linearly move and press one side of the backlight 1, such that the other side of the backlight 1 abuts against the fixing plate 41. In this way, all the backlights 1 passing through the alignment mechanism 4 are adjusted on the same straight line, so as to facilitate the code printing machine 6 printing the production information at consistent positions of the plurality of backlights 1. By means of the alignment mechanism 4, the backlight 1 may be automatically adjusted on the same straight line, without manual intervention, thereby reducing manpower waste, improving efficiency and not easily causing defect of the backlight 1. Moreover, there is no fixed width between the motion component and the fixing plate 41, which may be applied to correction of a wide range of backlights 1. The structure of the motion component is not limited to the above description. For example, the support component 42 may be an electric cylinder, an oil cylinder, or the like. Besides, the support component 42 may also use a rack and pinion, a worm gear structure, or the like.

Further, the alignment mechanism 4 may further include a second position sensor 44. The second position sensor 44 may be configured to sense whether the backlight 1 reaches an alignment position, such that the motion component pushes the backlight 1 in response to a sensing signal of the second position sensor 44. In the present exemplary embodiment, the second position sensor 44 may be mounted on the fixing plate 41, or may also be mounted on a bracket of the assembly line, and may also be mounted on the moving plate 43. The second position sensor 44 may be an optical fiber sensor, a proximity sensor or the like, which is not specially limited herein. The second position sensor 44 may accurately sense whether the backlight 1 reaches the correction position, and perform the correction of the backlight 1, to improve the intelligence of the entire device.

The specific operation process of the alignment mechanism is illustrated as follows.

After the second position sensor 44 senses that the backlight 1 reaches the correction position, the control system controls the linear cylinder to push the moving plate 43 to move out. The moving plate 43 pushes the backlight 1 toward the fixing plate 41, such that one side of the backlight 1 abuts against the fixing plate 41, to achieve the purpose of correcting the backlight 1. Then, the control system controls the linear cylinder to pull the moving plate 43 to retract, for preparing for correction of the next backlight 1.

Through the backlight position correction device of the present disclosure, the backlight 1 is driven to move linearly through an assembly line. A turnover mechanism 3 turns over the backlight 1 from a front-up state to the back-up state. A motion component pushes a side of the backlight 1, such that the opposite side of the backlight 1 abuts against the fixing plate 41, to align the plurality of the backlights 1 on the same straight line. On one hand, the backlight 1 is corrected by cooperation of the motion component and the fixing plate 41, which does not need manual intervention and reduces manpower waste. On the other hand, there is no fixed width between the motion component and the fixing plate 41, which may be applied to correction of a wide variety of backlights 1. On another hand, there is no need for human participation, efficiency is improved and it not easy to cause defect of the backlight 1.

The features, structures, or characteristics described above may be combined in any suitable manner in one or more embodiments, with the features discussed in various embodiments interchangeable, where possible. In the above description, numerous specific details are provided to provide a thorough understanding of embodiments of the present disclosure. However, those skilled in the art will recognize that the technical solutions of the present disclosure may be practiced without one or more of the specific details or that other methods, components, materials, etc. may be employed. In other instances, well-known structures, materials, or operations are not shown or described in detail to avoid obscuring aspects of the present disclosure.

Although relative terms, such as "up" and "down", are used in this specification to describe the relative relationship of one component of an icon in relative to another component, these terms are used herein for convenience only, e.g., the direction of the example described according to the accompanying drawings. It will be appreciated that if the device of the icon is flipped so as to be upside down, the component described as "up" will become the "down" component. Terms of other relativity, such as "high", "low", "top" and "bottom", also have similar meanings. When a structure is "on" other structures, it is possible to mean that one structure is integrally formed on other structures, or mean that one structure is "directly" disposed on other structures, or mean that one structure is "indirectly" disposed on other structures through another structure.

In the present specification, the terms "a", "an", "the" and "this" are used to indicate the presence of one or more elements/components/or the like; the terms "includes", "includes" and "has" mean open-ended inclusive meaning and mean that there may be additional elements/components/or the like in addition to the listed elements/components/or the like; the terms "first" and "second" and the like are merely used as labels, not limited to the number of objects.

It is to be understood that the present disclosure does not limit its application to the detailed construction and arrangement of components set forth in this specification. The present disclosure may have other embodiments and may be practiced and carried out in various ways. The foregoing variations and modifications fall within the scope of the present disclosure. It should be understood that, the present disclosure disclosed and defined in this specification extends to all alternative combinations of two or more of the individual features mentioned or evident from the text and/or the drawings. All of these different combinations constitute various alternative aspects of the present disclosure. The embodiments described in this specification illustrate the best mode known for implementing the present disclosure and will enable those skilled in the art to utilize the present disclosure.

What is claimed is:

1. A backlight position correction device, comprising:
   an assembly line; and
   an alignment mechanism, configured to adjust a position of the backlight on the assembly line,
   wherein the alignment mechanism comprises:
   a fixing plate, disposed at a first side of the assembly line; and
   a motion component, disposed at a second side of the assembly line opposite to the fixing plate, and configured to push a side of the backlight such that the backlight abuts against the fixing plate.

2. The backlight position correction device according to claim 1, wherein a contact area between the motion component and a side surface of the backlight is smaller than an area of the side surface of the backlight.

3. The backlight position correction device according to claim 1, further comprising:
   a turnover mechanism, disposed at a first side of the assembly line, and configured to turn over the backlight from a first state to a second state.

4. The backlight position correction device according to claim 3, wherein the turnover mechanism comprises:
   a rotating driving component, disposed at a first side of the assembly line;
   a rotating plate component, connected to the rotating drive component; and
   a suction block, disposed on the rotating plate component and configured to attach the backlight on the rotating plate component.

5. The backlight position correction device according to claim 4, wherein the rotating plate component comprises:
   a connecting plate, connected to the rotating driving component; and
   a plurality of protruding rods, connected to the connecting plate, and an extending direction of the plurality of protruding rods being perpendicular to a rotating shaft of the rotating plate component.

6. The backlight position correction device according to claim 5, wherein the assembly line comprises:

a plurality of strip-shaped carriers, at least two strip-shaped carriers arranged in parallel; and gaps disposed between the plurality of the strip-shaped carriers.

7. The backlight position correction device according to claim 6, wherein the strip-shaped carrier is a rubber band.

8. The backlight position correction device according to claim 6, wherein the plurality of protruding rods have a position corresponding to the gap and selectively passing through the gap.

9. The backlight position correction device according to claim 4, wherein the turnover mechanism further comprises:

a moving driving component, configured to drive the rotating driving component and the rotating plate component away from or close to the assembly line.

10. The backlight position correction device according to claim 3, wherein the turnover mechanism further comprises:

a position sensor, configured to sense whether the backlight reaches a turnover position, wherein the turnover mechanism turns over the backlight in response to a sensing signal of the position sensor.

11. The backlight position correction device according to claim 1, wherein the alignment mechanism further comprises:

a position sensor, configured to sense whether the backlight reaches an alignment position, wherein the motion component pushes the backlight in response to a sensing signal of the position sensor.

12. The backlight position correction device according to claim 1, wherein the motion component comprises:

a support component, provided with a moving shaft; and a moving plate, perpendicularly connected to the moving shaft.

* * * * *

UNITED STATES PATENT AND TRADEMARK OFFICE
CERTIFICATE OF CORRECTION

Page 1 of 1

PATENT NO. : 10,713,447 B2
APPLICATION NO. : 15/933456
DATED : July 14, 2020
INVENTOR(S) : Jiabin Xie et al.

It is certified that error appears in the above-identified patent and that said Letters Patent is hereby corrected as shown below:

On the Title Page

Foreign Priority Data Item (30):
"Aug. 29, 2017"
Should read:
---Sept. 29, 2017---

Signed and Sealed this
Twentieth Day of October, 2020

Andrei Iancu
*Director of the United States Patent and Trademark Office*